March 25, 1958   L. R. NIXON ET AL   2,828,464
CONTROL OF AIR-CONDITIONING APPARATUS
Filed Oct. 19, 1954   6 Sheets-Sheet 1
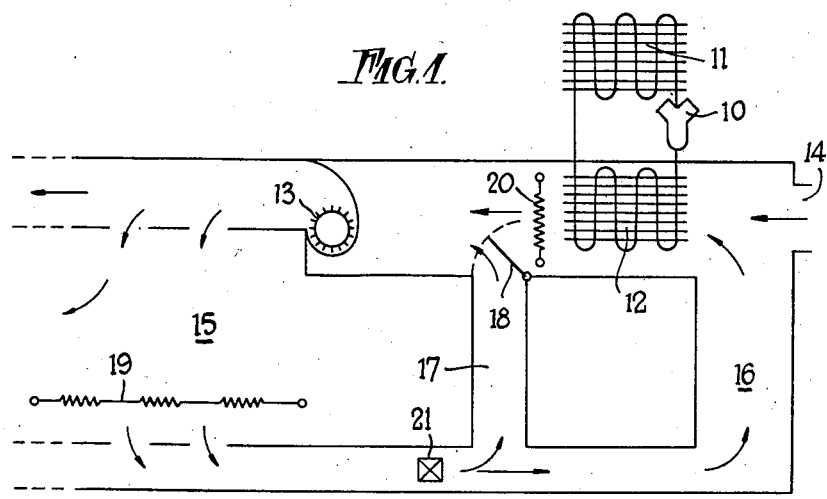
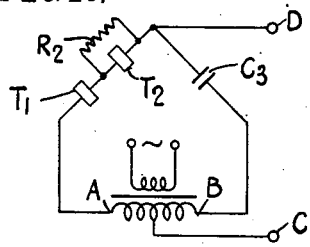
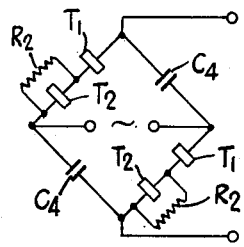
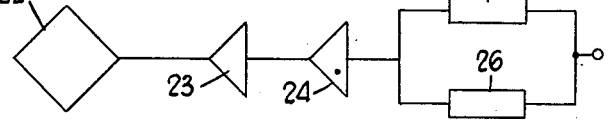
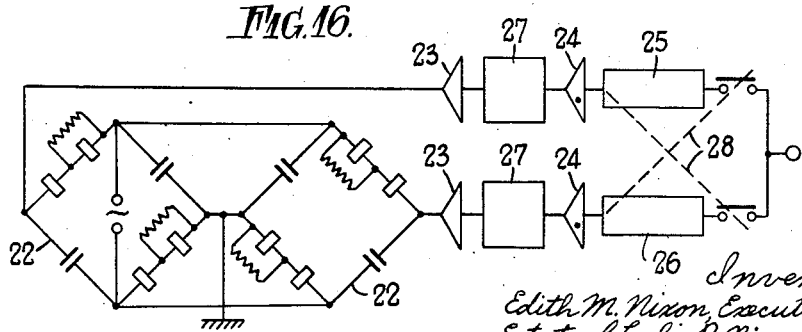

Inventors
Edith M. Nixon, Executrix of the
Estate of Leslie R. Nixon, deceased,
William Grant
by Sommers & Young, Attys.

VOLTAGE cd SMALL & IN PHASE.

VOLTAGE cd. LARGE & IN PHASE

March 25, 1958    L. R. NIXON ET AL    2,828,464
CONTROL OF AIR-CONDITIONING APPARATUS
Filed Oct. 19, 1954    6 Sheets-Sheet 4

BEHAVIOUR OF $V_2$

VOLTAGE cd IN PHASE.

BEHAVIOUR OF $V_1$

VOLTAGE cd IN PHASE

Inventors
Edith M. Nixon, Executrix of the
Estate of Leslie R. Nixon, deceased,
William Grant
by Sommers + Young, Attys.

March 25, 1958     L. R. NIXON ET AL     2,828,464
CONTROL OF AIR-CONDITIONING APPARATUS
Filed Oct. 19, 1954     6 Sheets-Sheet 5

Inventors
Edith M. Nixon, Executrix of the
Estate of Leslie R. Nixon, deceased,
William Grant
by Sommers & Young, Attys.

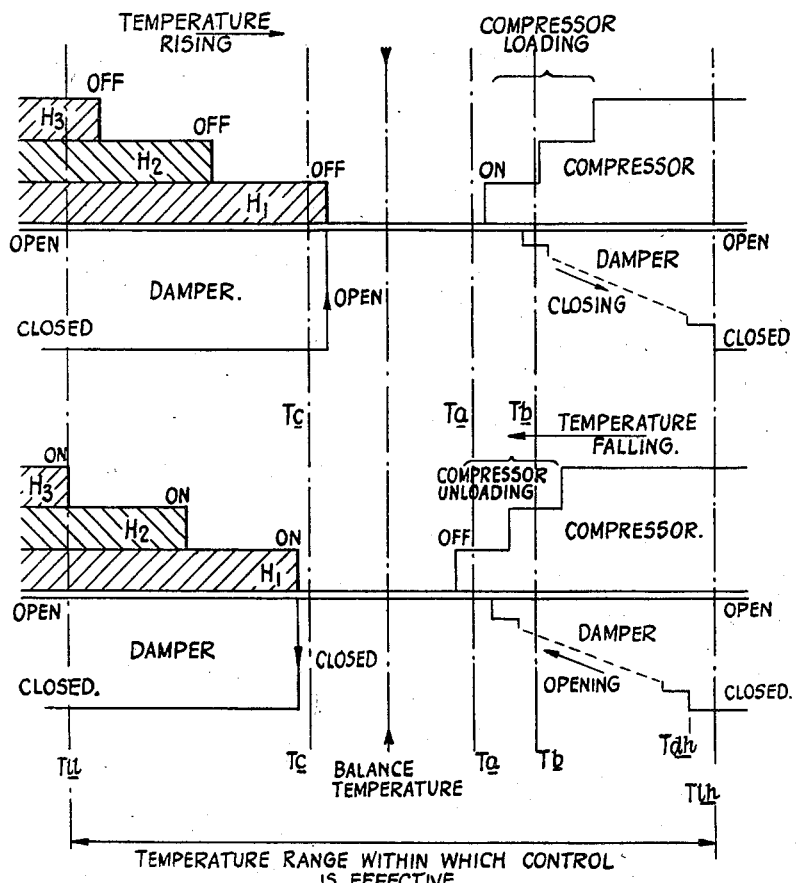
FIG. 11A.
FIG. 11B
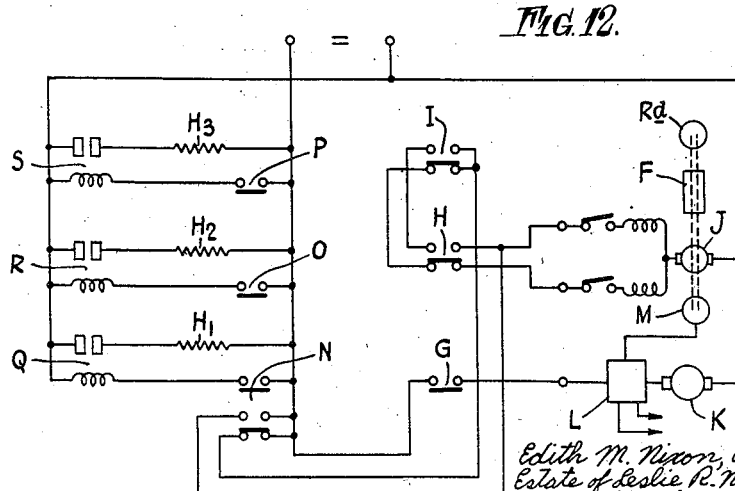
FIG. 12.

United States Patent Office 2,828,464
Patented Mar. 25, 1958

2,828,464

CONTROL OF AIR-CONDITIONING APPARATUS

Leslie Reginald Nixon, deceased, late of Catford, London, England, by Edith Maud Nixon, executrix, Catford, London, and William Grant, Brockley, London, England, assignors to J. Stone & Company (Deptford) Limited, Deptford, London, England Application October 19, 1954, Serial No. 463,294

Claims priority, application Great Britain October 21, 1953

5 Claims. (Cl. 323—67)

This invention concerns improvements relating to the control of air-conditioning apparatus, especially but not exclusively for vehicles. An object of the invention is to provide simple but effective control means for regulating the temperature and humidity of air in enclosures such as railway vehicles.

According to the invention, the component of the apparatus which is sensitive to the condition or conditions to be controlled is a bridge circuit comprising both a temperature-sensitive element and humidity-sensitive element, preferably "dry-bulb" and "wet-bulb" temperature-sensitive elements.

Advantageously, temperature-sensitive and humidity-sensitive elements in one limb or each of two limbs of a bridge circuit comprise resistors of a material having a substantial temperature coefficient of resistance, other limbs of the bridge circuit comprising resistors with a zero or negligible such coefficient or inductors or capacitors. Provision can then readily be made for adjusting or setting the proportion of the effects of the said elements in the control exercised. The proportion is preferably such that the response of the bridge circuit is to the "effective temperature" condition, as defined by the American Society of Heating and Ventilating Engineers. However, other conditions between response to "dry-bulb" temperature and response to "wet-bulb" temperature may be obtained by such adjustment or setting.

Discrimination between a condition requiring cooling and a condition requiring heating may be produced through the intermediary of a difference of phase of alternating current or between positive and negative polarity of direct current influenced by the aforesaid sensitive component. For this purpose, the bridge circuit may be arranged to give an output which is substantially proportional to the difference between the controlled condition and a pre-determined temperature condition and which has opposite phase or polarity depending upon whether the difference is above or below the predetermined temperature condition. Alternatively, the bridge circuit may be arranged to give an output which is substantially constant but whose phase displacement is substantially proportional to the difference between the controlled condition and a predetermined temperature condition. In one case, the magnitude of the output and in the other case the phase displacement affords a measure of the cooling or heating effect called for.

Means for translating the response of the bridge circuit into a progressively varying current output adapted for producing a sequence of cooling-control or heating-control operations, possibly combined with phase or polarity discriminating means, may comprise "hard" thermionic valves or thyratron valves having sequentially operated control means, generally relay means, arranged as anode loading.

In a combined discriminating and translating arrangement, the signal applied to the grids of the valves may be an amplified alternating current derived from the response of the bridge circuit. Alternatively, the discriminating means may comprise so-called ring modulators arranged to provide a direct-current signal which can be applied to the valves of the translating means.

The cooling-control means may comprise not only relay means for controlling the running of a refrigerator, but also relay means for regulating the position of a valve controlling an air-recirculation by-pass, the valve being coupled with a device influencing the energisation of the second-named relay means in such a sense that maximum energisation tending to adjust the valve towards minimum air recirculation is obtained with the valve in the position for maximum recirculation.

Advantageously, the cooling-control means is also adapted for controlling variable-speed operation of the refrigerator compressor, for example by a speed-controlling device coupled to the operating means for the by-pass valve.

Various ways of carrying the invention into effect will now be described by way of example and with reference to the accompanying drawings, in which:

Figure 1 is a schematic representation of an air-conditioning installation,

Figure 5:
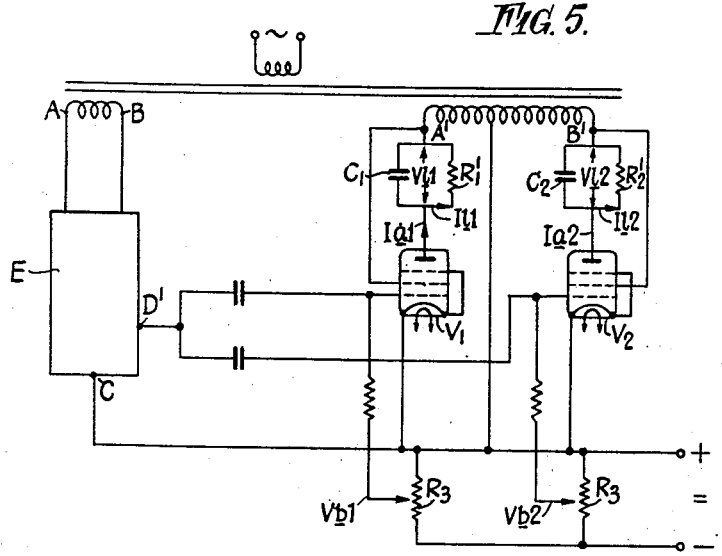
Figure 5 is a circuit diagram of a hard-valve phase-discriminating and signal-translating arrangement.
Figure 6:
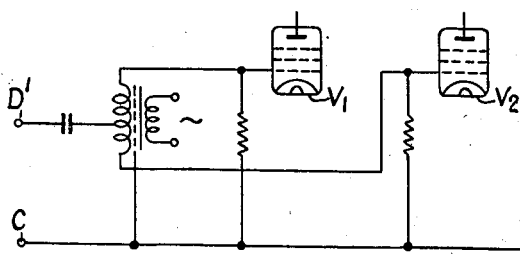
Figure 5A:
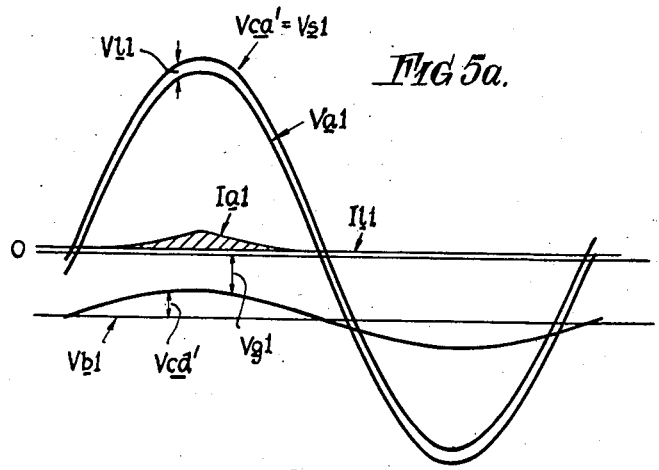
Figure 5B:
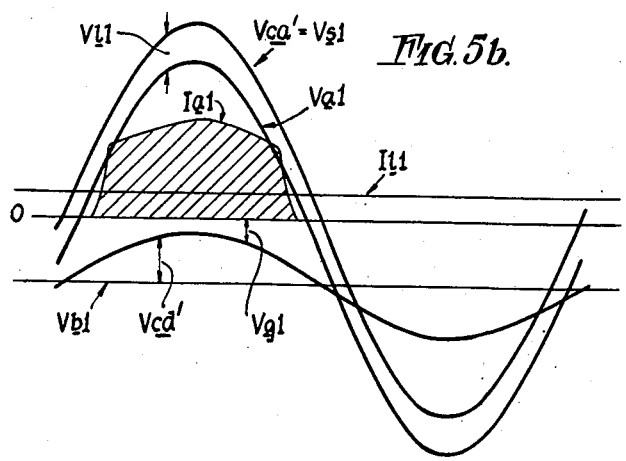
Figure 5C:
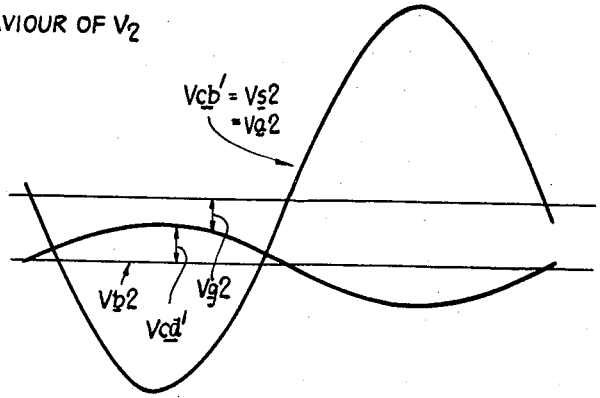
Figure 6A:
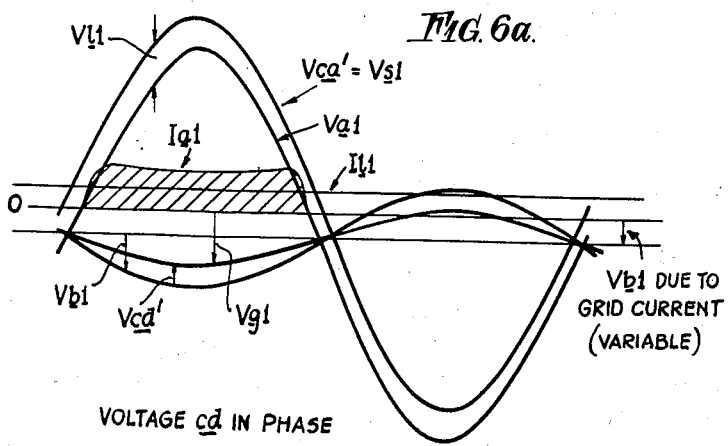
Figure 8:
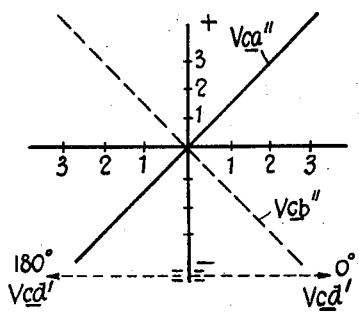
Figure 7:
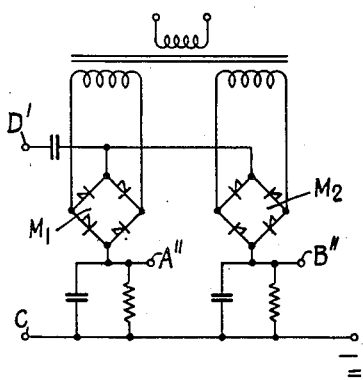
Figure 9:
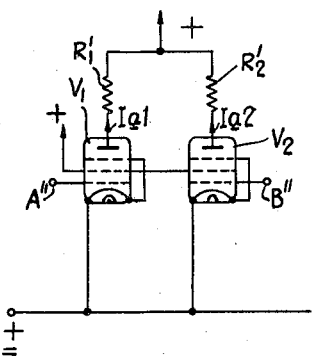
Figure 10:
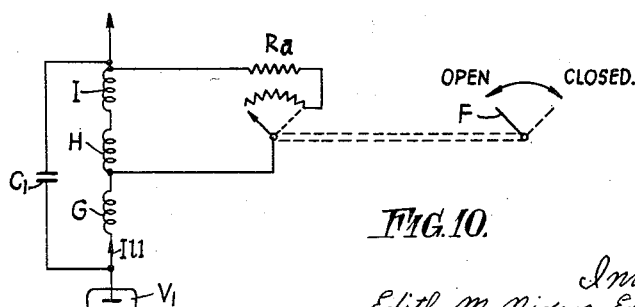

Figures 5a–5c represent potential-difference/time curves illustrating the operation of the arrangement of Figure 5, Figure 6 is a circuit diagram illustrating a modification, Figure 6a represents curves similar to those of Figures 5a–5c, but for the modification of Figure 6, Figure 7 is a circuit diagram of an alternative discriminating means, Figure 8 represents a voltage diagram illustrating the operation of the arrangement of Figure 7, Figure 9 is a circuit diagram of a translating means, Figure 10 is a circuit diagram of damper-control means, Figures 11a and 11b are diagrams illustrating the operation of the whole apparatus, Figure 12 is a circuit diagram for relay-controlled circuits of the apparatus, Figures 13 and 14 are circuit diagrams of further, alternative forms of bridge circuits, and Figures 15 and 16 are diagrams illustrating modes of use of such circuits.

It will be assumed that the apparatus to be described is employed for controlling the temperature and humidity of air in a railway coach. An air-conditioning installation to which the invention is applicable for this purpose is illustrated by way of example in Figure 1. In this installation, use is made, for controlled cooling, of a refrigeration system comprising a compressor 10, liquid receiver and condenser 11 and an evaporator 12 over which air is drawn by a fan 13. This air is made up partly of fresh air drawn from the atmosphere at 14 and partly of recirculated air drawn from the interior 15 of the coach by way of a duct 16. This air mixture passes over the evaporator 12, by which it is cooled, and is delivered to the interior of the coach by the fan 13. A by-pass loop 17 controlled by a damper 18 allows a proportion of recirculated air to be returned to the coach without passing over the evaporator 12. The humidity of the conditioned air delivered by the fan 13 to the coach can be adjusted in known manner by varying the proportions of the volumes of air which pass over the evaporator 12 and through the by-pass 17. For controlled heating, use is made of a system of heaters comprising air heaters, indicated at 20, in the air inflow beyond the evaporator 12 and heaters, indicated at 19, near the floor of the coach. Temperature-sensitive and humidity-sensitive elements of the control means are located at 21.

The temperature-sensitive and humidity-sensitive component of the control means is a bridge circuit which may take one of several forms: In the circuits illustrated in Figures 2–4, a substantially constant alternating voltage is supplied at A, B, either through a transformer whose secondary winding forms one half of the bridge (Figure 2) or directly (Figures 3 and 4), and the output from the circuit is taken at C, D. Temperature-sensitive elements $T_1$ and $T_2$ are resistors, such as those known by the trademark "Thermistor," of a material having a high temperature coefficient of resistance which may be positive or negative, the latter case being assumed in the following description. The two elements may be arranged in one limb, the sensing limb, of the bridge (Figures 2 and 3) or in opposite limbs (Figure 4). Another limb, the balancing limb, comprises an adjustable resistor $R_1$. A calibrating resistor $R_2$ also adjustable, is connected across the element $T_2$. Resistors $T_0$ forming other limbs, the so-called ratio limbs, of the bridges and also the resistors $R_1$, $R_2$ are made of a material having a zero or negligible temperature coefficient of resistance.

The elements $T_1$ and $T_2$ are exposed to the atmosphere of the coach at some point such as 21 (Figure 1) where there is a steady flow of air. If, after the resistor $R_1$ has been set to balance the bridge under any desired combination of conditions, the temperature rises, a voltage will be developed at D which, with respect to C, has the same alternating polarity as that at A with respect to C and which has a magnitude proportional to the temperature rise, provided that the latter is small. Conversely, a fall in temperature will develop a voltage at D which has the same relative polarity as that at B. That is to say, with reference to the voltage at CA, the voltage at CD is either in phase or 180° out of phase depending upon whether the prevailing temperature is higher or lower than the balance temperature, while the amplitude of the voltage at CD is proportional to the difference between the said temperatures.

Whereas the temperature-sensitive part of the element $T_1$ is dry, that of the element $T_2$ is enclosed in a wick, so that its temperature is maintained at the prevailing dew point of the atmosphere, the wick being kept wet by a supply of water in known manner. If it is assumed that the dry-element temperature is constant and that the bridge is balanced at a relative humidity of, say, 50%, an increase of humidity will raise the temperature of the element $T_2$ and a decrease will depress it. Thus an increase of humidity has the same effect upon the output of the bridge as an increase of temperature, this being the required effect. The value of the resistor $R_2$ is selected or is adjustable to give a desired proportion to the effect of the element $T_2$. As required, this proportion may be made such that the bridge responds substantially to "dry-bulb" temperature or substantially to "wet-bulb" temperature or to an intermediate temperature condition, particularly to the aforesaid "effective temperature" condition.

The voltage at CD is passed to an amplifier designed to produce a negligible phase shift at the frequency employed. The bridge and amplifier are indicated diagrammatically at E in Figure 5. The amplifier delivers a signal current to a discriminating arrangement designed to produce energisation of relays (represented in Figure 5 by the resistor $R_1^1$) affecting cooling or relays (represented by the resistor $R_2^1$) affecting heating, depending upon the phase of the amplified voltage $Vcd^1$ at C, $D^1$, that is upon whether the prevailing temperature is above or below the balance temperature. The discriminating arrangement comprises pentode valves $V_1$, $V_2$ having capacitors $C_1$, $C_2$ connected in parallel with respective resistors $R_1^1$, $R_2^1$ in their anode circuits and resistors $R_3$ for adjusting their direct-current grid-bias voltages.

The operation of this arrangement will be described with reference to Figures 5a–5c. In the following description and the figures. $Vca^1$ and $Vcb^1$ indicate the voltages between the common point C and the points $A^1$ and $B^1$ respectively. $Va1$ and $Va2$ are the anode voltages, $Vs1$ and $Vs2$ are the screen-grid voltages, $Vb1$, $Vb2$ the grid-bias voltages and $Vg1$, $Vg2$ the grid voltages respectively for the valves $V_1$, $V_2$. With the bridge balanced, the bias voltages $Vb1$ and $Vb2$ are adjusted to give small equal currents $Il1$ and $Il2$ through the resistors $R_1^1$ and $R_2^1$. If the bridge is out of balance due to a small increased prevailing temperature, the condition illustrated in Figure 5a obtains. The amplified in-phase voltage $Vcd^1$, which is positive-going when the voltages $Va1$ and $Vs1$ are positive-going, will produce in the valve $V_1$ pulses of anode current $Ia1$ which are integrated by the capacitor $C_1$ and will develop an average current $Il1$ through the resistor $R_1^1$ and an average voltage $Vl1$ across the same. The pulse-time rise and exponential decay of $Il1$ and $Vl1$ may be ignored, since the value of $C_1$ must be large enough to maintain $Il1$ and $Vl1$ almost constant.

If the prevailing temperature is higher, the amplified voltage $Vcd^1$ will be greater and the pulses of current $Ia1$ of larger amplitude. This condition is illustrated by Figure 5b.

Under the same conditions, the amplified voltage $Vcd^1$ is negative-going when the voltages $Vcb^1$, $Va2$ and $Vs2$ for the valve $V_2$ are positive going. Consequently the current $Ia2$ will be rapidly cut off and will remain zero as $Vcd^1$ increases, as illustrated by Figure 5c.

If the bridge is out of balance due to low prevailing temperature, that is if the amplified voltage $Vcd^1$ is 180° out of phase, the circuit will operate in the manner just described, mutatis mutandis, but with the valve $V_2$ active. Thus, while the valve $V_2$ is conducting, the valve $V_1$ will be cut off. If required, additional provision may be made for rendering the valve $V_2$ definitely non-conducting while the valve $V_1$ is conducting and vice versa. For this purpose, means may be provided for locking out the one valve as soon as the other valve commences to conduct, for example by an auxiliary contact on the first relay which responds when the said other valve becomes conducting.

The grid-bias voltages $Vb1$, $Vb2$ may alternatively be made alternating voltages. A suitable modification for this purpose is shown in Figure 6. The manner of operation for a condition in which the voltage $Vcd^1$ is in phase is illustrated by Figure 6a.

Instead of alternating-current bridge circuits, direct-current bridge circuits may be employed. In this case circuits similar to those in Figures 3 and 4 may be adopted, the terminals A, B being connected to a source of direct current and the terminals C, D to a direct-current amplifier in place of the amplifier E in Figure 5. The coupling capacitors shown beyond this amplifier are omitted, but the same arrangement may otherwise be employed. With direct-current bridge circuits, discrimination is obtained by reference to difference in polarity of the output from the terminals C, D.

Other discriminating arrangements may be employed instead of that of Figure 5. For instance, as illustrated in Figure 7, use may be made of two oppositely sensed ring modulators $M_1$, $M_2$, connected at the points C and C', like the discriminating arrangement of Figure 5, to a bridge and amplifier E the carrier voltages applied being in phase with the voltage supply to the temperature-sensitive bridge circuit. The output obtained from each modulator is illustrated by Figure 8 in which the direct-current output voltages $Vca''$ and $Vcb''$, between C and $A''$ and $B''$ respectively, are plotted against the alternating voltage $Vcd^1$, the units shown being arbitrary. The outputs of the two modulators are connected, at $A''$, $B''$ respectively, to the control grids (Figure 9) of a pair of output valves $V_1$ and $V_2$ which are operated from a direct-current voltage supply, a bias voltage $V_b$ being applied as indicated.

One of the valves $V_1$, $V_2$, will be rendered conducting depending upon whether the voltage supplied at CD' is such that the modulator $M_1$ or the modulator $M_2$ applies a positive voltage to the respectively associated valve $V_1$ or $V_2$.

Relays controlling the heating and represented by the resistor $R_2{}^1$ in Figures 5 and 9, for example three relays N, O, P whose contacts are shown in Figure 12, controlling a series of heaters $H_1$, $H_2$, $H_3$ (distributed between the heater positions 19, 20 in Figure 1) as hereinafter described, are arranged to be actuated sequentially at increasing values of the average current $Il2$ (Figures 5 and 6). A small, although definite, differential between the operation and release of the relays is desirable.

Figure 10 illustrates a series arrangement of cooling-control relays G, H, I (whose windings are connected in place of, and are represented by, the resistor $R_1{}^1$ in Figure 5 or Figure 9) designed to be operated in close sequence with increasing average current $Il1$. Relay G, when operated, starts the compressor of the refrigeration system and, when released, stops it.

The action of the current $Il1$ on the relays H, I is modified by an adjustable shunt $R_d$ which is mechanically coupled to a damper F occupying the position of the damper 18 in Figure 1 and controlling the by-pass 17. The shunt resistance is greatest when the damper is open and least when it is closed. When the shunt $R_d$ has its greatest resistance, the relays H, I follow the relay G in operation in that order. The relays H, I are arranged to act upon the drive for the damper F in such a manner that when both are released, the damper moves towards the open position; when either (in practice H) is operated and the other released, the damper is stationary and, when both are operated, the damper moves towards the closed position. Assuming that the current $Il1$ increases sufficiently to operate all three relays G, H, I and then remains constant, the damper F will move towards the closed position and the resistance of the shunt $R_d$ will be reduced, thus reducing the proportion of the current $Il1$ passing through the relays H, I. When the current through the relay I is reduced by an amount corresponding to its differential, the said relay will release and the damper F will be arrested and remain in the position reached until the current $Il1$ again changes. Should the prevailing temperature rise, the current $Il1$ will increase, the relay I will be operated and the damper F will be further closed. Should the prevailing temperature fall, on the other hand, the current $Il1$ will decrease and the damper F will be opened.

One effective mode of operation of control means such as have been described above is illustrated in Figures 11a and 11b in which the switching on and off of the heaters $H_1$, $H_2$ and $H_3$, the switching on and off of the refrigerator compressor 10 (Figure 1) and the opening and closing of the damper F are plotted against rising temperature in Figure 11a and falling temperature in Figure 11b. At any given temperature, a change between rising and falling temperature entails a change-over from Figure 11a to Figure 11b or vice versa, with the proviso that, at the given temperature, the condition of operation does not actually change.

For example, if the temperature has been rising (Figure 11a) and reached the value $Ta$, stops rising and commences to fall, the operation ceases to be determined by Figure 11a and is thereafter determined by Figure 11b, but the compressor remains off, since the temperature has not reached the value at which the compressor relay G operates. Conversely, if the temperature has been falling (Figure 11b) and reached the value $Ta$, stops falling and commences to rise (Figure 11a), the compressor remains on, since the temperature has not reached the value at which the compressor relay G releases.

Operation during initial preconditioning may be as follows: Whatever the state of the control means when switched off at the end of the previous run and whatever the prevailing temperature when preconditioning commences, neither heating nor cooling can be applied until the equipment warms up. During warming up, which may take about one minute, the by-pass damper F is moving towards the open position.

Then, if the prevailing temperature is close to the balance temperature, the damper F will continue to move in the same direction until arrested by a limit switch at the fully open position. The control means thereafter waits for any change of temperature.

If the prevailing temperature is high (above $Tlh$ in Figures 11a and b, the compressor is started and the damper F is moved towards the closed position. When the temperature has fallen to $Tdh$, the damper begins to open and the controlled temperature settles down with, say, small rises and falls about the value $Tb$.

If the prevailing temperature is low (below $Tll$), full heat is applied and the damper F is moved towards the closed position and remains closed until heat is no longer called for. The controlled temperature rises and settles down with, say, small rises and falls about the value $Tc$.

Figure 12 illustrates a suitable relay-controlled circuit including the contacts of the relays G, H, I whose windings are connected in place of the $R_1{}^1$ in Figure 5 or Figure 9 and whose contacts respectively control a motor J for driving the damper F and adjusting the resistor $R_d$, a motor K driving the compressor and a controller or contactor L controlling the motor K and itself energised by way of a speed-control-means M. Figure 12 also shows the contacts of relays N, O, P controlling the heaters $H_1$, $H_2$, $H_3$ through contactors Q, R, S.

As already indicated with reference to Figures 11a and 11b, the cooling can be additionally regulated by speed control of the compressor motor K. To effect this by simple means and in an advantageous fashion, the speed-control means M, for example a rheostat, is mechanically coupled to the shaft of the damper F, as diagrammatically indicated in Figure 12, and co-operates with the controller L so that the compressor runs slowly when started and is progressively speeded up towards a maximum as the demand for cooling increases, that is as the prevailing temperature rises. By the provision of lost-motion linkage, the temperature span corresponding to the speed range of the compressor may be made less than, equal to or greater than the temperature span corresponding to the movement of the damper from the open to the closed position.

If required, the apparatus may be provided with an anticipator device dependent upon rate of change of conditions or to correct for sudden external changes. Such a device may be made adjustable to compensate for time lag in the apparatus.

Figure 2:
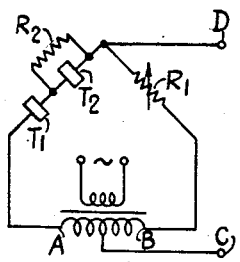
Figures 2–4 are diagrams of alternative forms of temperature-sensitive and humidity-sensitive bridge circuits.
Figure 3:
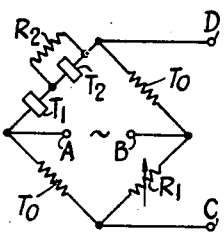
Figure 4:
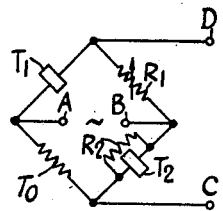

In place of the bridge circuits illustrated in Figures 2–4, use may be made of bridge circuits giving a substantially constant output over a range of phase displacement substantially proportional to variation of the temperature condition from a predetermined condition. Thus, Figure 13 shows an arrangement which is similar to that of Figure 2 except for the substitution of a capacitor $C_3$ for the resistor $R_1$. This circuit can be made to give a constant output voltage at the terminals C, D over a range of variation of phase of that voltage. An output with similar charcteristics can be obtained from the bridge circuit of Figure 14 in which two opposite limbs comprise elements $T_1$, $T_2$ and $R_2$ similar to those of Figure 3 and the other two limbs comprise capacitors $C_4$.

As illustrated by the block diagram of Figure 15, the output of such a bridge circuit 22 may be supplied through an amplifier 23 to a thyratron output stage 24 whose output serves to actuate cooling-relay means 25 and heating relay means 26. The output of the thyratron stage may be made to vary substantially linearly with temperature variation in the same sense or in the opposite sense. The cooling relay means 25 and heating relay means 26 respectively may be arranged to respond to variation of the output above and below a mean output corresponding to the predetermined temperature condition or conversely.

Alternatively, two bridge circuits 22 may be arranged as shown in Figure 16, each being associated with a respective relay means, 25 or 26, through a sequence comprising an amplifier 23, a device 27 for effecting a phase change of 90° and a thyratron output stage 24. In this arrangement, two outputs are obtained, one of which is substantially proportional to temperature fall below the desired temperature and producing, say, an increasing phase angle, but which is zero for temperature rise and decreasing phase angle, while the other behaves in the opposite fashion. The two sets of relay means may be arranged to be interlocked as diagrammatically indicated at 28.

It is claimed:

1. In combination with apparatus for controlling the condition of air in an enclosure and including a polarity-discriminatory arrangement, a Wheatstone-bridge device responsive to the said condition and having limbs consisting of sensing means, balancing means, and ratio means, said sensing means comprising a dry-temperature sensitive resistor element and a wet-temperature sensitive resistor element each having a high temperature co-efficient of resistance, while the balancing means and the ratio means are impedances, including at least one variable impedance having a substantially zero temperature co-efficient, a variable resistor having a substantially zero temperature coefficient being connected as a shunt across one temperature sensitive element, said variable impedances being adjustable for setting the "effective" temperature at which balance is achieved and the shunt resistor being adjustable for proportioning the effects of the wet-sensitive and dry-sensitive elements, and said bridge device being connected to the said discriminatory arrangement for supplying thereto an output with a variable function substantially proportional to the difference between the "effective" temperature in the enclosure and the set "effective" temperature and with a relative polarity condition which depends upon whether the former temperature is higher or lower than the latter.

2. In combination with apparatus for controlling the condition of air in an enclosure and including a polarity-discriminatory arrangement, a direct-current Wheatstone-bridge device responsive to the said condition and consisting of a sensing limb, a balancing limb, and two ratio limbs, said sensing limb comprising a dry-temperature sensitive resistor element and a wet-temperature sensitive resistor element each having a high temperature co-efficient of resistance, while said balancing limb is a variable resistor having a substantially zero temperature coefficient and said ratio limbs are fixed resistors having a substantially zero temperature coefficient, a variable resistor having a substantially zero temperature coefficient being connected as a shunt across the wet-temperature sensitive element, said balancing limb being adjustable for setting the "effective" temperature at which balance is achieved and the shunt resistor being adjustable for proportioning the effects of the wet-sensitive and dry-sensitive elements, the bridge device having its output connected to the said discriminatory arrangement for supplying thereto a direct voltage whose value is substantially proportional to the difference between the "effective" temperature in the enclosure and the set "effective" temperature and whose relative polarity is positive or negative depending upon which temperature is the higher.

3. In combination with apparatus for controlling the condition of air in an enclosure and including a phase-discriminatory arrangement, an alternating-current Wheatstone-bridge device responsive to the said condition and consisting of a sensing limb, a balancing limb, and two ratio limbs, said sensing limb comprising a dry-temperature sensitive resistor element and a wet-temperature sensitive resistor element each having a high temperature coefficient of resistance, while said balancing limb is a variable resistor having a substantially zero temperature coefficient and the ratio limbs are fixed resistors having a substantially zero temperature coefficient, a variable resistor having a substantially zero temperature coefficient being connected as a shunt across the wet-temperature sensitive element, said balancing limb being adjustable for setting the "effective" temperature at which balance is achieved and the shunt resistor being adjustable for proportioning the effects of the wet-sensitive and dry-sensitive elements, said bridge device having its output connected to the said discriminatory arrangement for supplying thereto an alternating voltage whose value is substantially proportional to the difference between the "effective" temperature in the enclosure and the set "effective" temperature and whose relative phase depends upon whether the former temperature is higher or lower than the latter.

4. In combination with apparatus for controlling the condition of air in an enclosure and including a phase-discriminatory arrangement, an alternating-current Wheatstone-bridge device responsive to the said condition and consisting of sensing, balancing, and ratio limbs, a sensing limb comprising a dry-temperature sensitive resistor element and a wet-temperature sensitive resistor element each having a high temperature coefficient of resistance, while said balancing limb is a fixed reactor, a variable resistor having a substantially zero temperature coefficient being connected as a shunt across the wet-temperature sensitive element for proportioning the effects of the wet-sensitive and dry-sensitive elements, said bridge device having its output connected to the said discriminatory arrangement for supplying thereto a substantially constant alternating voltage whose phase displacement in relation to a given phase angle is substantially proportional to the difference between the "effective" temperature in the enclosure and a predetermined "effective" temperature and which leads or lags the given angle depending upon which temperature is the higher.

5. Apparatus as claimed in claim 1, wherein said dry-temperature sensitive and wet-temperature sensitive resistor elements are connected in series in one limb of the bridge, said variable resistor being connected as a shunt across the wet-temperature sensitive element.

References Cited in the file of this patent

UNITED STATES PATENTS

| | | |
|---|---|---|
| 856,944 | Cramer | June 11, 1907 |
| 1,459,391 | Clausen | June 19, 1923 |
| 1,623,712 | Wood | Apr. 5, 1927 |
| 1,989,829 | Specht | Feb. 5, 1935 |
| 2,130,092 | Kettering | Sept. 13, 1938 |
| 2,144,668 | Stoessel | Jan. 24, 1939 |
| 2,218,468 | Haines | Oct. 15, 1940 |
| 2,272,492 | Weyer | Feb. 10, 1942 |
| 2,275,317 | Ryder | Mar. 3, 1942 |
| 2,304,044 | Whittle | Dec. 1, 1942 |
| 2,602,591 | Wilson et al. | July 8, 1952 |
| 2,628,076 | Smith | Feb. 10, 1953 |